United States Patent [19]

Miyata

[11] 4,019,191

[45] Apr. 19, 1977

[54] PHOTOMETRIC DEVICE FOR USE IN A SINGLE LENS REFLEX CAMERA

[75] Inventor: Katsuhiko Miyata, Saitama, Japan

[73] Assignee: Asahi Kogaku Kogyo Kabushiki Kaisha, Tokyo, Japan

[22] Filed: Mar. 5, 1975

[21] Appl. No.: 555,704

[30] Foreign Application Priority Data

Mar. 23, 1974 Japan ............. 49-33269[U]

[52] U.S. Cl. .................. 354/155; 354/31; 354/56; 354/225

[51] Int. Cl.² .............. G03B 19/12; G03B 13/02

[58] Field of Search ......... 354/31, 56, 59, 152, 354/155, 224, 225, 49, 42

[56] References Cited

UNITED STATES PATENTS

| | | | |
|---|---|---|---|
| 3,106,129 | 10/1963 | Frenk et al. | 354/42 |
| 3,513,759 | 5/1970 | Kondo | 354/56 |
| 3,532,043 | 10/1970 | Shimomura et al. | 354/54 |
| 3,649,112 | 3/1972 | Sherwood | 354/49 X |
| 3,724,349 | 4/1973 | von Belvard et al. | 354/31 |
| 3,762,286 | 10/1973 | Hasegawa | 354/31 |
| 3,855,601 | 12/1974 | Uchiyama et al. | 354/31 |
| 3,884,584 | 5/1975 | Tsunekawa et al. | 354/31 X |

FOREIGN PATENTS OR APPLICATIONS

| | | | |
|---|---|---|---|
| 1,274,438 | 8/1968 | Germany | 354/152 |
| 15,751 | 2/1965 | Japan | 354/152 |

*Primary Examiner*—Edna M. O'Connor
*Attorney, Agent, or Firm*—Christensen, O'Connor, Garrison & Havelka

[57] ABSTRACT

A photometric device for use in a single lens reflex camera comprising a photometric optical system and a light receiving element disposed behind a pentaprism is disclosed. The light receiving element is disposed at a position where the image of a subject, imaged on a focusing glass plate by the photographing lens, is refocused by the photometric lenses. The light receiving area of the light receiving element is sized so that only a portion of the light refocused by the photometric lenses is received to provide a photometric operation that gives priority to a portion of the subject image.

2 Claims, 4 Drawing Figures

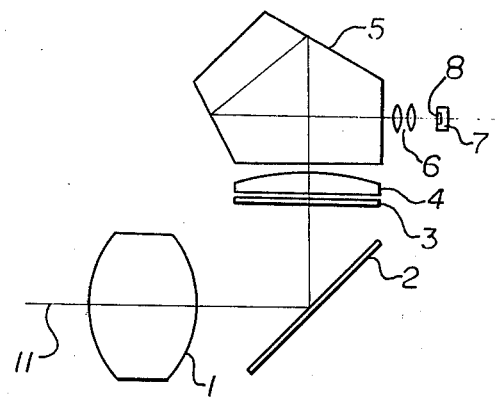
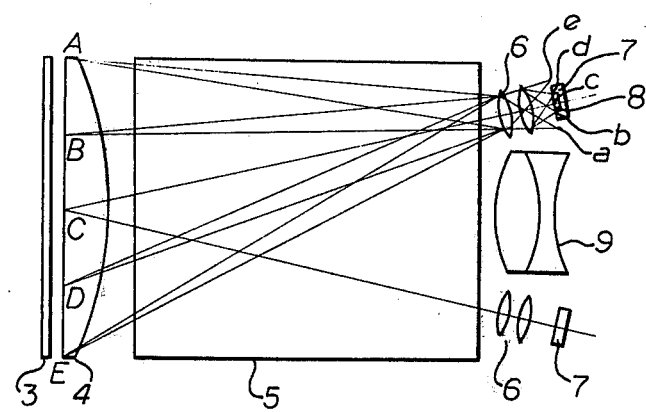
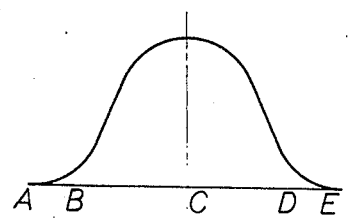
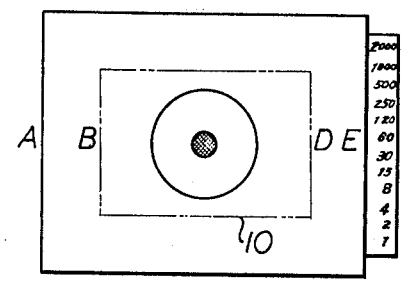

PHOTOMETRIC DEVICE FOR USE IN A SINGLE LENS REFLEX CAMERA

BACKGROUND OF THE INVENTION

This invention relates to photometric devices and, more particularly, to photometric devices suitable for use in single lens reflex cameras.

Photometric devices are utilized by single lens reflex cameras to either provide an indication of how the camera should be adjusted or automatically control certain camera adjustments, such as shutter speed, for example, for a particular lighting condition. In recent years attempts have been made to extend the operative range of photometric devices to increasingly lower brightness levels. Spot photometry (center area priority photometry) has become an increasingly popular technique designed to achieve this result. However, at the present time light receiving elements suitable for operating properly at lower brightness levels are difficult to produce. Further, prior art attempts to measure the light from a subject by arranging a photometric device behind a pentaprism have not been as satisfactory as desired because an insufficient photoelectric output has been obtained.

Therefore, it is an object of this invention to provide a new and improved photometric device.

It is another object of this invention to provide a photometric device that develops a large photometric output even at low brightness levels, and allows spot photometry.

In the past, increased photoelectric output has been obtained by placing a lens system in front of a light receiving element. However, such a system makes it difficult to freely select the brightness range of the light to be measured. A prior art method of eliminating this disadvantage is to mount a light (optical) stop in front of the light receiving element and, thereby, control the photometric range. This method, however, is inefficient and does not effectively improve the accuracy of the photometric operation. More specifically, this system is ineffective because the light receiving element is not utilized over its entire light receiving surface; rather, it is used only over the limited area defined by the light stop. Because the dark current flowing through the light receiving element is generally proportional to the tip area of this element and varies largely with temperature, as the brightness of the subject becomes lower, the dark current adversely affects the photometric operation as a noise signal. This noise signal reduces the so-called signal-to-noise (S/N) ratio and, hence, the accuracy of the photometric operation. Consequently, it is desired to eliminate the light stop, design the light receiving element as small as possible and use all of its light receiving surface.

Therefore, it is a further object of this invention to provide a photometric device that utilizes a small light receiving element, yet develops a sufficiently large photoelectric output even in low brightness regions to provide a photometric device suitable for use in a single lens reflex camera.

It still another object of this invention to provide a photometric device suitable for use in a single lens reflex camera that does not require the inclusion of a light stop.

SUMMARY OF THE INVENTION

In accordance with principals of this invention, a photometric device suitable for use in a single lens reflex camera is provided. The photometric device comprises a photometric optical system and a light receiving element disposed behind a pentaprism. The light receiving element is positioned such that the image of a subject image formed on a focusing glass plate is refocused by the photometric lenses onto the light receiving element. The light receiving area of the light receiving element is selected so that only a portion of the light coming from the reproduced image of the subject image is received. Thus, photometric operation giving priority to only a portion of the subject image is provided.

It will be appreciated from the foregoing brief summary that the invention provides a photometric device which requires no light stop means; yet, the invention develops a photoelectric output adequate for use in a single lens reflex camera. The light receiving element may be made very small without loss of an adequate photoelectric output. The design of the invention permits spot photometry (central area priority photometry) and, accordingly, makes it possible to perform a photometric operation with improved accuracy.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a schematic side elevational view of a photometric device formed in accordance with the invention positioned in the optical system of a single lens reflex camera;

FIG. 2 is a plan view of a portion of the optical system illustrated in FIG. 1 including the invention;

FIG. 3 is a graphical representation of the distribution of the light received by the light receiving element illustrated in FIGS. 1 and 2; and, FIG. 4 is a plan view of the pattern observed at the eye piece illustrated in FIG. 2 and includes an outline of the area of the light received by the light receiving element illustrated in FIGS. 1 and 2.

DESCRIPTION OF THE PREFERRED EMBODIMENT

FIG. 1 is a side elevational view of a photometric optical system formed in accordance with the invention illustrated in combination with a photographic lens 1 forming a part of a single lens reflex camera. Light received by the photographing lens 1 along its principal optical axis 11 is redirected by a mirror 2. The redirected light passes through an ogthogonally arrayed Fresnel lens plate 3 and is imaged onto a focusing glass 4, which also serves as a condensing lens. After passing through the focusing glass 4, the light enters a pentaprism 5. The light is redirected by the pentaprism 5 and is focused by photometric lenses 6 onto light receiving elements 7. In an actual physical embodiment of the invention, better illustrated in FIG. 2, a pair of photometric lenses and light receiving elements 7 are located on either side of an eyepiece 9. The eyepiece 9 is adapted to view the image seen by the photographic lens 1 and imaged by the Fresnel lens on the focusing glass 4. The light receiving elements 7 are provided with effective light receiving surfaces 8 more fully described hereinafter.

FIG. 2 is a plan view of a photometric system formed in accordance with the invention. FIG. 2 illustrates the peripheral positions of the imaging surface defined by the focusing glass 4 at points A and E. The peripheral positions of the photometric area, i.e., the area seen by the light receiving surfaces 8 of the light receiving elements 7 are indicated at points B and D. The center of the image is indicated at point C. Points $a$, $b$, $c$, $d$ and $e$ located in the plane defined by the light receiving surface 8 of the upper light receiving element 7 correspond to points A, B, C, D and E, respectively. Corresponding points $a$, $b$, $c$, $d$ and $e$ and their related lines are not shown in relation to the lower light receiving element for purposes of clarity. The reproduced image defined by points $a$, $b$, $c$, $d$ and $e$ is, of course, formed by the photometric lenses 6.

FIG. 4 is a pattern diagram illustrating the pattern observed in the view finder, i.e., through the eyepiece 9. The area of spot photometry corresponding to the photometric area defined by the peripheral position points B and D are shown by dash-dot line 10.

Turning now to a description of the operation of the invention, the light coming from a subject after passing through the photographing lens 1 is reflected or redirected by the mirror 2 to the Fresnel lens plate. The Fresnel lens plate forms an image of the subject on the focusing surface of the focusing glass 4, which also serves as a condenser lens, as noted above. The image passes through the pentaprism 5 and is redirected thereby to the photometric lenses 6. The photometric lenses image or refocus the subject light onto the light receiving surfaces 8 of the light receiving elements 7.

The present invention makes it possible to carry out average photometry, if the light receiving elements employed have a light receiving area equal in size to that of the reproduced image of the total imaging surface (image of the full aperture) formed by the light receiving surface 8. On the other hand, the use of light receiving elements having a light receiving area smaller than the entire area of the reproduced image allows spot photometry to be accomplished. In FIG. 2 the images of points A and E are formed at points $a$ and $e$ outside of the light receiving surface and the images of points B and D are formed at points $b$ and $d$ located close to the periphery of the light receiving surface. The photometric area will therefore correspond to the spot photometry (center area priority photometry) area 10 defined in FIG. 4 between points B and D. FIG. 3 is a graphical representation of the distribution of the received light. It will be appreciated from this graph that center area priority photometry is achieved in an advantageous manner by the invention.

The clearness and size of the reproduced image of the image formed on the imaging or focusing glass 4 will vary depending on the performance of the photometric lenses. By selecting suitable photometric lenses and a suitably sized light receiving area, the photometric optical device of the invention may be selected to operate over a wide range of values.

In a single lens reflex camera, the space formed behind the pentaprism system in which the photometric optical system of the invention is to be mounted is very narrow. Thus, it is preferred that the photometric optical system of the invention be designed to be as small as possible. Since the area of the focusing surface and the space in between the focusing surface and the photometric lenses are determined by the size of the camera body, the position and size of the image of the focusing plate are determined almost exclusively by the refractive index and radius of curvature of the photometric lenses 6 that are chosen. Present manufacturing techniques allow a light receiving element to be produced that has an accurately controlled light receiving area within an error of less than ±0.01mm. It is pointed out for practitioners of the present invention that the light receiving element should be designed so that the photometric device can exhibit a maximum effect because an excessively narrow light receiving area will have an output signal that will be too small for successful operation at low light levels.

One advantage of the present invention is that the photometric area can be readily controlled by suitably selecting the photometric lenses and the light receiving element. Another advantage of the invention lies in that even after the light receiving area has been chosen, the output of the light receiving element and the photometric area can be varied over a certain range by shifting the light receiving element and, hence, the light receiving surface thereof to and fro along the optical axis defined by the photometric lenses. For example, when the light receiving surface is shifted towards the photometric lenses, the output of the light receiving element will be increased to thereby change the photometric operation from central area priority photometry to average photometry, and vice versa. Hence, the invention is suitable for use in various environments.

It will be appreciated from the foregoing description that the invention provides a new and improved photometric device particularly suitable for use in single lens reflex cameras. The invention comprises a photometric optical system adapted to reimage the subject image previously focused on a focusing glass onto a light receiving element. Preferably, the light received is such that only a portion of the subject image is actually imaged onto the surface of the light receiving element. The light receiving element is quite small, yet provides an output adequate for use in a single lens reflex camera even under low light conditions. This is accomplished without the requirement of an optical stop, or a large light receiving element. Preferably, two photometric devices formed in accordance with the invention, one located on either side of a camera eyepiece, will be utilized in a physical embodiment of the invention.

While a preferred embodiment of the invention has been illustrated and described, it will be appreciated by those skilled in the art and others that various changes can be made therein without departing from the spirit and scope of the invention. Hence, the invention can be practiced otherwise than as specifically described herein.

The embodiments of the invention in which an exclusive property or privilege is claimed are defined as follows:

1. In a single lens reflex camera wherein light from a subject is imaged by a camera lens on a focusing means for viewing by an eyepiece through a pentaprism, the improvement comprising a photometric device located beside said eyepiece, said photometric device comprising:
   a first photometric lens mounted on one side of said eyepiece in a position such that said first photometric lens receives light through said pentaprism from substantially the entire area encompassed by the subject imaged by the camera lens of said single lens reflex camera on said focusing means for viewing by said eyepiece; and, a first light receiving element having a photosensitive surface, said first light receiving element mounted at the focal plane of said first photometric lens such that light received by said first photometric lens impinges on the entire photosensitive surface of said first light receiving element, said photosensitive surface being sized such that said impinging light is only a portion of the light received by said first photometric lens through said pentaprism from the area encompassed by the subject imaged by the photographic lens of the single lens reflex camera on said focusing means for viewing by said eyepiece, said first light receiving element producing an electrical output related to the intensity of the light impinging on said photosensitive surface of said first light receiving element.

2. The improvement claimed in claim 1 including:

a second photometric lens mounted on a side of said eyepiece opposed to the side on which said first photometric lens is mounted and in a position such that said second photometric lens receives light through said pentaprism from substantially the entire area encompassed by the subject imaged by the photographic lens of said single lens reflex camera on said focusing the means for viewing by said eyepiece; and, a second light receiving element having a photosensitive surface, said second light receiving element mounted at the focal plane of said second photometric lens such that light received by said second photometric lens impinges on the entire photosensitive surface of said second light receiving element, said photosensitive surface being sized such that said impinging light is only a portion of the light received by said second photometric lens through said pentaprism from the area encompassed by the subject imaged by the photographic lens of said single lens reflex camera on said focusing means for viewing by said eyepiece, said second light receiving element producing an electrical output related to the intensity of the light impinging on said photosensitive surface of said second light receiving element.

* * * * *